US008351174B1

(12) United States Patent
Gardner et al.

(10) Patent No.: US 8,351,174 B1
(45) Date of Patent: Jan. 8, 2013

(54) APPARATUS COMPRISING A BROWN-OUT PROTECTION CIRCUIT FOR MEMORY DEVICES (75) Inventors: Norman D. Gardner, Mission Viejo, CA (US); Mingying Gu, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 577 days.

(21) Appl. No.: 12/608,918

(22) Filed: Oct. 29, 2009

(51) Int. Cl.
*H02H 3/24* (2006.01)
(52) U.S. Cl. .......................................... 361/92
(58) Field of Classification Search .................. 361/92
See application file for complete search history.

(56) References Cited

U.S. PATENT DOCUMENTS

| 4,893,564 | A  | * | 1/1990  | Ochi et al. ................... 102/218 |
| 5,606,511 | A  | * | 2/1997  | Yach ............................... 702/64 |
| 6,590,304 | B1 | * | 7/2003  | Manning et al. .............. 307/131 |
| 6,600,668 | B1 |   | 7/2003  | Patel et al. |
| 7,310,251 | B2 |   | 12/2007 | Yang et al. |
| 2004/0054937 | A1 | * | 3/2004 | Williams et al. .............. 713/300 |
| 2004/0217794 | A1 | * | 11/2004 | Strysko ......................... 327/263 |
| 2006/0012451 | A1 | * | 1/2006 | De Cremoux ................ 333/216 |
| 2006/0202727 | A1 | * | 9/2006 | Ruettiger et al. ............. 327/143 |
| 2008/0001591 | A1 | * | 1/2008 | Yang ............................ 323/299 |
| 2009/0096506 | A1 | * | 4/2009 | Ogiwara et al. ............... 327/530 |

OTHER PUBLICATIONS

Power Supply Supervisory/Over and Undervoltage Protection Circuit, ON Semiconductor, MC3425, Apr. 2001, Rev. 3, Publication Order No. MC3425/D, 13 pages.
High-Voltage, Overvoltage/Undervoltage, Protection Switch Controller, Maxim, MAX6399, 19-3655, Rev. 1, Mar. 2006, 10 pages.
Dual Bootstrapped, High Voltage MOSFET Driver with Output Disable, ADP3419, On Semiconductor, Jan. 2008, Rev. 2, Publication Order No. ADP3419/D, 13 pages.

* cited by examiner

*Primary Examiner* — Jared Fureman
*Assistant Examiner* — Scott Bauer (57) ABSTRACT

An apparatus and method for regulating an output voltage ($V_O$) of a voltage regulator during a brown-out condition is described. The apparatus comprises the voltage regulator, a brown-out protection circuit, a switch, and a first capacitor. The voltage regulator charges the first capacitor to the regulated output voltage $V_O$. The brown-out protection circuit is coupled to the voltage regulator and the switch. In operation, the brown-out protection circuit detects the occurrence of an undervoltage condition based on a first undervoltage detection signal received at an undervoltage detection input, the brown-out protection circuit disables the voltage regulator and closes the switch to discharge the first capacitor to below a predetermined voltage level.

46 Claims, 8 Drawing Sheets

APPARATUS COMPRISING A BROWN-OUT PROTECTION CIRCUIT FOR MEMORY DEVICES

BACKGROUND

Memory devices such as Dynamic Random Access Memory (DRAM) and Double Data Rate Dynamic Random Access Memory (DDR DRAM) are widely used in computers and other electronic devices for the storage and retrieval of data. DDR DRAM devices use source synchronous transfers when data is written to or read from the memory devices. Second generation Double Data Rate (DDR-II) devices are defined by a JEDEC Solid State Technology Association Standard JESD90.

DDR-II devices require some form of externally supplied voltage to carry out various memory operations, including memory read, program and erase operations. Voltages of various magnitudes may be required to carry out these operations. Sometimes a situation may occur where the supply voltage of the particular system incorporating the DDR-II devices enters a low voltage condition. Typically, the supply voltage levels are permitted to vary by approximately 5-10% from the specified level and the DDR-II device will still operate correctly. However, if the supply voltage level falls outside the specified ranges, the data in the DDR-II device may become corrupted or lost.

If the supply voltage level falls below a specified level, the JEDEC Standard requires that DDR-II devices be properly reset. Accordingly, what is needed are apparatus and methods utilizing a brown-out protection circuit for effectively responding to a low supply voltage condition to prevent improper DDR-II device operation.

BRIEF DESCRIPTION OF THE DRAWINGS

Embodiments are illustrated by way of example, and not limitation, in the figures of the accompanying drawings in which.

DETAILED DESCRIPTION

Embodiments of the apparatus and methods are described herein with reference to figures. However, particular embodiments may be practiced without one or more of these specific details, or in combination with other known methods, materials, and apparatuses. In the following description, numerous specific details are set forth, such as specific electronic devices, materials, dimensions, and processes parameters etc. to provide a thorough understanding. Reference throughout this specification to "an embodiment" means that a particular feature, structure, electronic device, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, electronic devices, materials, or characteristics may be combined in any suitable manner in one or more embodiments.

Reference throughout this specification to "one embodiment," "an embodiment," or similar language means that a particular feature, structure, electronic device, or characteristic described in connection with the embodiment is included in at least one embodiment of the invention. Thus, appearances of the phrases "in one embodiment," "in an embodiment," and similar language throughout this specification may refer to separate embodiments or may all refer to the same embodiment.

Furthermore, the described features, structures, electronic devices, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other electronic devices, methods, components, materials, and so forth. In other instances, well-known electronic devices, structures, materials, or operations are not shown or described in detail to avoid obscuring aspects of the invention.

Figure 1:
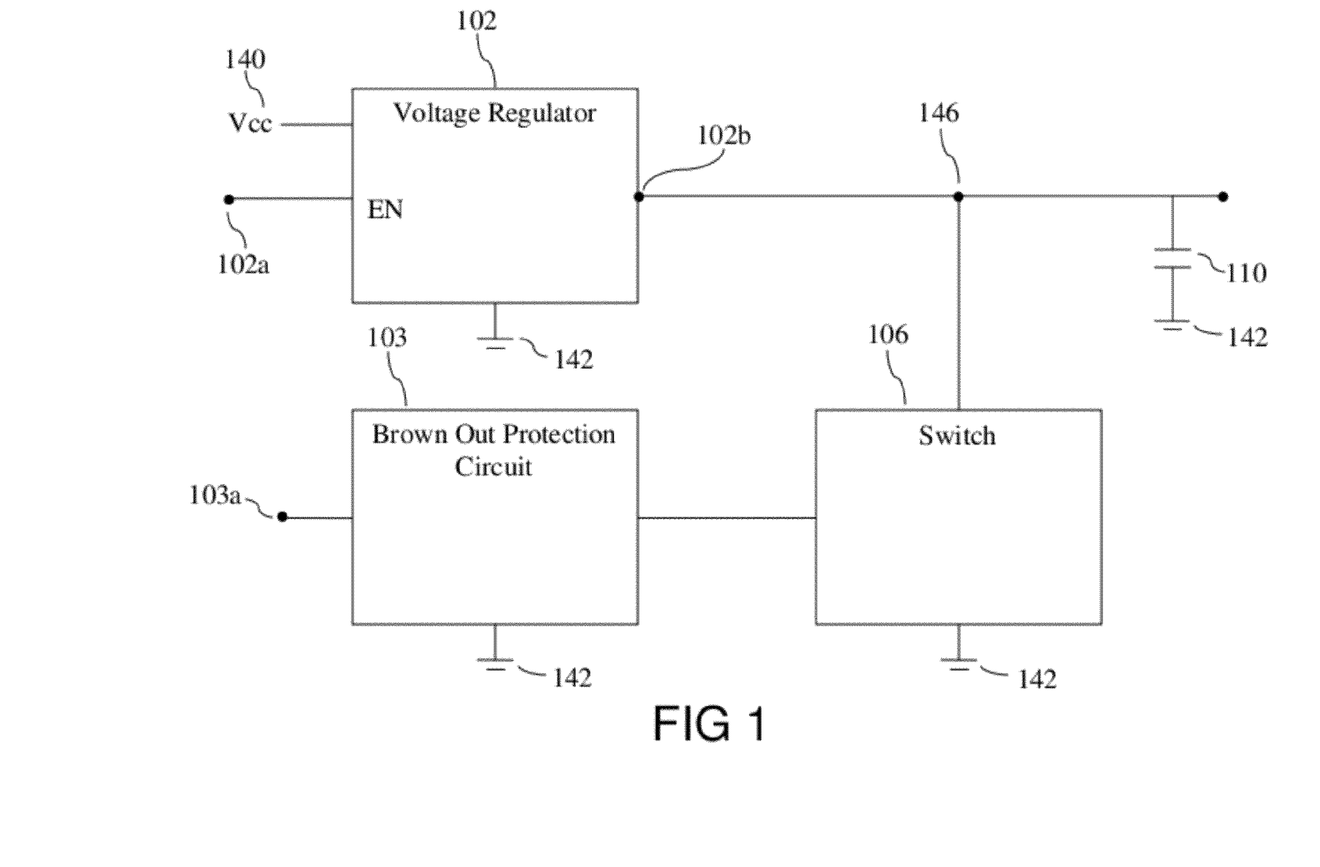
FIG. 1 is a schematic diagram illustrating one embodiment of an apparatus comprising a brown-out protection circuit.

FIG. 1 illustrates an apparatus comprising a brown-out protection circuit 103 according to one embodiment of the present invention. The apparatus also comprises a voltage regulator 102, a switch 106, and a first capacitor 110.

The regulator 102 provides a regulated output voltage ($V_O$), which may be provided to a memory device such as a Dynamic Random Access Memory (DRAM) or a Double Data Rate Dynamic Random Access Memory (DDR DRAM). Specifically, the voltage regulator 102 is operable to provide the regulated output voltage ($V_O$) to the first capacitor 110 coupled to an output node 146. The voltage regulator 102 is also coupled to a voltage reference source Vcc 140 and a low voltage sink 142. In one embodiment of the present invention, the voltage reference source Vcc provides 5 volts and the low voltage sink is at a ground potential (GND). The voltage regulator also has an enable input 102a which receives an enable signal.

The brown-out protection circuit 103 is operatively coupled to the voltage regulator 102 and the switch 106. The brown-out protection circuit 103 also comprises a first undervoltage detection input 103a that receives a first undervoltage detection signal. The switch 106 is coupled to the first capacitor 110 at the output node 146. In one embodiment of the invention, the switch 106 may be implemented by a transistor, such as an N-channel MOSFET (NMOS) transistor.

When an undervoltage condition occurs, the brown-out protection circuit 103 detects the condition based on the first undervoltage detection signal received at the undervoltage detection input 103a. The brown-out protection circuit 103 then provides a switch output signal that causes the switch 106 to close and couple the first capacitor 110 to the low voltage sink 142. This discharges the regulated output voltage Vo across the first capacitor 110 to below a predetermined voltage level. In one embodiment, the predetermined voltage level may be 300 mV, however, any suitable voltage level may be used based on the device requirements.

The undervoltage detection signal may be derived from any location or source that may be used to indicate an undervoltage condition. In one embodiment, the first undervoltage detection signal comprises a signal derived from the voltage reference source Vcc 140. In another embodiment, the first undervoltage detection signal may comprise a reset signal provided by an external source to indicate that the voltage regulator 102 should be reset. In another embodiment, the first undervoltage detection signal may comprise a signal derived from the regulated output voltage (Vo).

In general, the undervoltage condition will be a transient condition except for when the device is powered down. In these situations, the brown-out protection circuit may detect passage of the condition based on the first undervoltage detection signal. When this occurs, the brown-out protection circuit 103 provides a switch output signal that causes the switch 106 to open, which disconnects the first capacitor 110 from the low voltage sink 142.

In one embodiment, the first undervoltage detection signal may also be used to determine when to enable the voltage regulator 102. In this embodiment, when the undervoltage condition has passed, the voltage regulator 102 is enabled to charge the first capacitor 110 to the regulated output voltage Vo. The voltage on the first capacitor 110 increases from a first output voltage level to a second output voltage level. In one embodiment of the invention, the regulated output voltage Vo increases monotonically from a first output voltage level to a second output voltage level. The first output voltage level may be approximately less than 300 mV and the second output voltage level may be approximately equal to 1.8 V.

Figure 2:
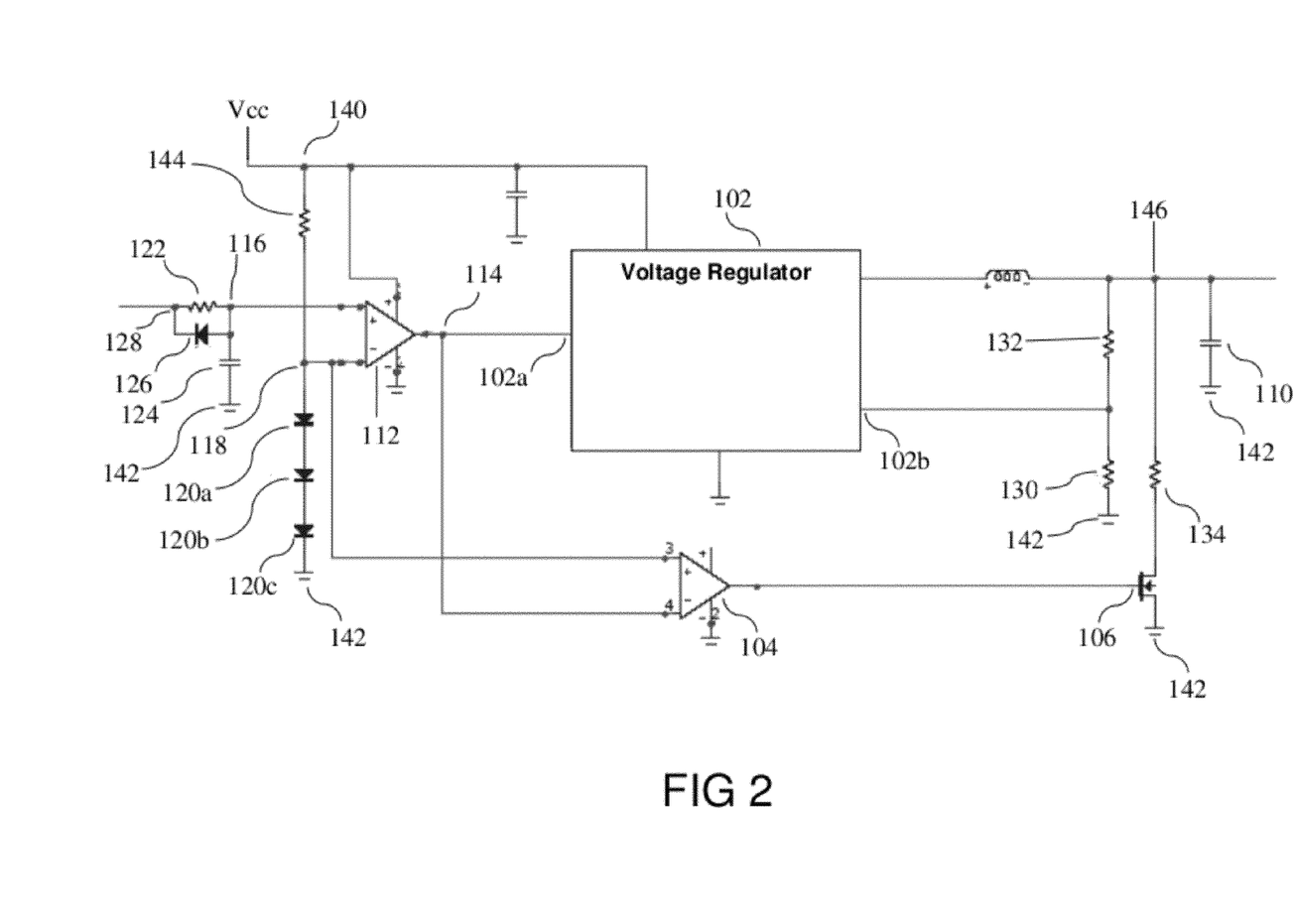
FIG. 2 is a schematic diagram illustrating another embodiment of an apparatus comprising a brown-out protection circuit.

FIG. 2 illustrates an apparatus according to another embodiment of the invention. In this embodiment, the brown-out protection circuit 103 (see FIG. 1) comprises a first comparator 112 and a second comparator 104. A first undervoltage detection signal is provided at the first undervoltage detection input 116, which is coupled with the non-inverting input of the first comparator 112. A second undervoltage detection signal is provided at a second undervoltage detection input 118, which is coupled with the inverting input of the first comparator 112. The output of the first comparator 112 is coupled to the inverting input of the second comparator 104 and the enable input 102a of the voltage regulator 102. The second undervoltage detection signal may be provided to the non-inverting input of the second comparator 104 as well.

In this embodiment, the second undervoltage detection signal is generated by the voltage reference source Vcc 140 coupled with a resistor 144 and a plurality of diodes 120a, 120b, and 120c. In one embodiment, the second undervoltage detection signal generated at the second undervoltage detection input 118 may be approximately 1.8 volts, however, any voltage level may be used to create an appropriate voltage threshold.

In one embodiment, the first undervoltage detection signal comprises a signal derived from the voltage reference source Vcc 140. For example, the first undervoltage detection signal may be based on a voltage source signal approximately equal to 2.5 volts that is derived from a voltage reference source Vcc that is approximately equal to 5 volts.

When an undervoltage condition occurs in this embodiment, the first undervoltage detection signal will go below the threshold set by the second undervoltage detection signal, causing the first comparator 112 to transition to a low level of approximately 0 volts. The output signal of the first comparator 112 is then provided to the non-inverting input of the second comparator 104. The second comparator 104 compares the low level output signal to the second undervoltage detection signal and provides a switch output signal that causes the switch 106 to close. This couples the first capacitor 110 to the low voltage sink 142 to discharge the first capacitor 110 to below a predetermined voltage level. In this embodiment, the output signal of the first comparator 112 also disables the voltage regulator 102.

After the undervoltage condition has passed, the first undervoltage detection signal will return to a high level above the threshold set by the second undervoltage detection signal causing the first comparator 112 to transition to a high level. The output signal of the first comparator 112 is then provided to the non-inverting input of the second comparator 104. The second comparator 104 compares the high level output signal to the second undervoltage detection signal and provides a switch output signal that causes the switch 106 to open which disconnects the first capacitor 110 from the low voltage sink 142.

The output signal of the first comparator 112 may also be used to enable the voltage regulator 102. The voltage regulator 102 is enabled to charge the first capacitor 110 to the regulated output voltage Vo. The voltage on the first capacitor 110 increases from the first output voltage level to the second output voltage level. In one embodiment of the invention, the regulated output voltage Vo increases monotonically from approximately less than 300 mV to approximately equal to 1.8 V.

In the embodiment illustrated in FIG. 2, the apparatus further comprises a delay circuit to allow for proper timing of the discharge of the regulated output voltage Vo across the first capacitor 110 to below the predetermined voltage level. The delay circuit provides a delay by allowing a second capacitor 124 to charge at a predetermined rate such that the first undervoltage detection signal at the first undervoltage detection input 116 increases above the second undervoltage detection signal over a predetermined time period. The delay circuit defines an RC time constant comprising a resistor 122 and a diode 126 coupled in parallel between an input node 128 and a first node 116, and the second capacitor 124 coupled between the first node 116 and the low voltage sink 142 (GND). This delay allows the first capacitor 110 coupled to the low voltage sink 142 by switch 106 to discharge the regulated output voltage Vo below the predetermined voltage level before charging again.

Figure 3:
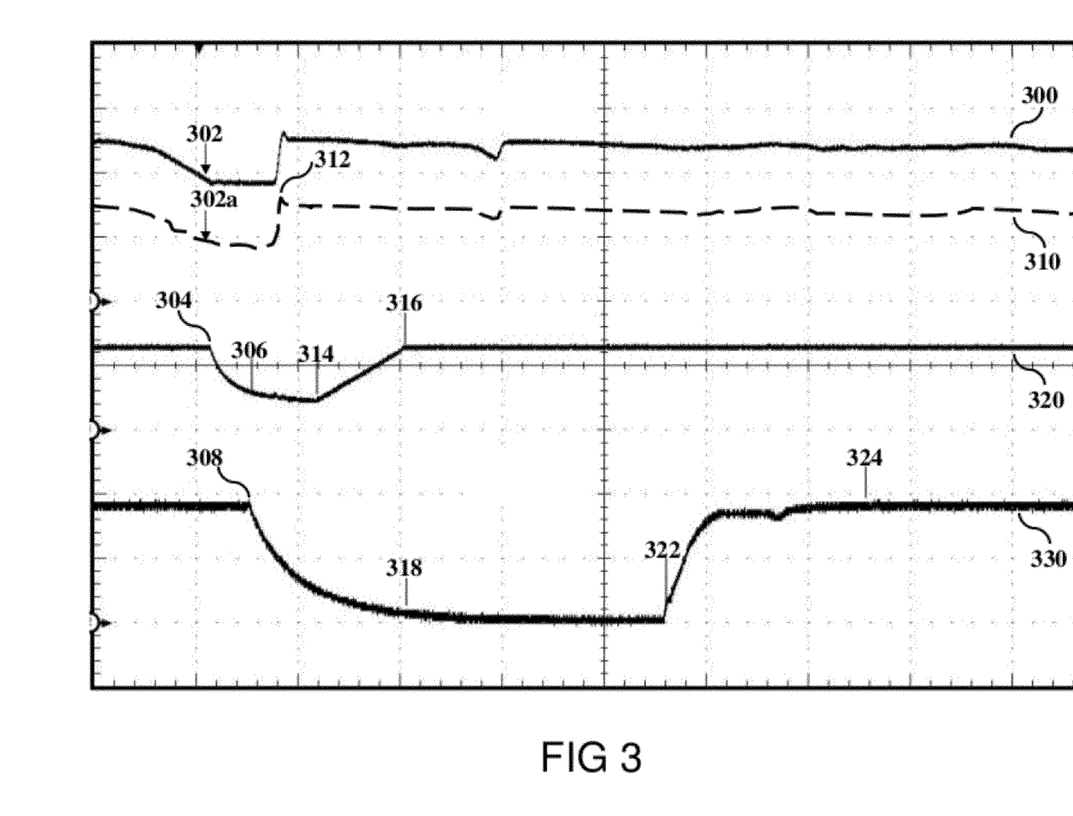
FIG. 3 illustrates example waveforms of an undervoltage event and a response of an embodiment of an apparatus comprising a brown-out protection circuit.

FIG. 3 illustrates example waveforms of an undervoltage event and a response according to one embodiment of the apparatus of FIG. 2 comprising the brown-out protection circuit and the delay circuit. A voltage reference source Vcc 300 illustrates the occurrence of an undervoltage condition 302. An initial undervoltage detection signal 310 is also illustrated that may be derived from the voltage reference source Vcc 140 and applied to input node 128. For example, the initial undervoltage detection signal 310 may be approximately equal to 2.5 volts derived from a 5 volt Vcc. A first undervoltage detection signal 320 is also illustrated from the first node 116 to the first comparator 112. A regulated output voltage Vo 330 is also illustrated as measured at output node 146.

Referring to FIG. 2 and FIG. 3, operation of this embodiment will now be described. The occurrence of the undervoltage condition 302 results in the transition of the initial undervoltage detection signal 310 to a lower level 302a at the input node 128. This causes the second capacitor 124 to discharge to a lower voltage level. This is shown as the first undervoltage detection signal 320 decreases from point 304 to point 306 at the first node 116 to the first comparator 112. At point 306, the first undervoltage detection signal 320 has transitioned low causing the first and second comparators 112, 104 to change state to disable the voltage regulator 102 (point 308) and to close the switch 106 to couple the first capacitor 110 to the low voltage sink 142 and discharge the regulated output voltage Vo 330 across the first capacitor 110 to below the predetermined voltage level (point 308 to point 318).

After the undervoltage condition has passed, the initial undervoltage detection signal 310 transitions to a high level (point 312). The delay circuit provides a delay by allowing the second capacitor 124 to charge at a predetermined rate such that the first undervoltage detection signal 320 increases above the second undervoltage detection signal (approximately 1.8 volts) over a predetermined time period from point 314 to point 316. This delay allows the first capacitor 110 coupled to the low voltage sink 142 to discharge the regulated output voltage Vo below the predetermined voltage level (point 318).

At point 316, the first undervoltage detection signal 320 has transitioned high (2.5 V) and the first and second comparators 112, 104 change state to enable the voltage regulator 102 (point 322) and to open the switch 106 to stop the discharge of the regulated output voltage Vo across the first capacitor 110. The enabled voltage regulator 102 then provides the regulated output voltage Vo to the first capacitor 110 at the output node 146 to charge the first capacitor 110 (point 322 to point 324). The regulated output voltage Vo thereby increases from the predetermined voltage level to the second output voltage level.

The embodiment in FIG. 2 may further comprise a resistive voltage divider provided at the voltage regulator output node 102b. The regulated output voltage ($V_O$) across the first capacitor 110 is determined by the resistor divider coupled between a voltage regulator output ($V_{FB}$) 102b and the output node 146. The resistor divider comprises a first resistor 132 coupled between $V_{FB}$ 102b and the output node 146 and a second resistor 130 coupled between $V_{FB}$ 102b and the low voltage sink 142 (GND) such that regulated output voltage $V_O = V_{FB}(1+R_1/R_2)$.

In embodiments of the present invention the first and second comparators 112, 104 may comprise first and second differential operational amplifiers. Also, any suitable voltage regulator, operational amplifiers, diodes, or transistors may be used for embodiments of the present invention.

In an alternative embodiment, the first undervoltage detection signal may be provided directly to the inverting input of the second comparator 104 in FIG. 2 and the enable input 102a of the voltage regulator 102. The second undervoltage detection signal may be provided directly to the non-inverting input of the second comparator 104. The second comparator 104, voltage regulator 102, switch 106, and first capacitor 110 then operate in response to the undervoltage condition in a similar fashion as that described previously.

Figure 4:
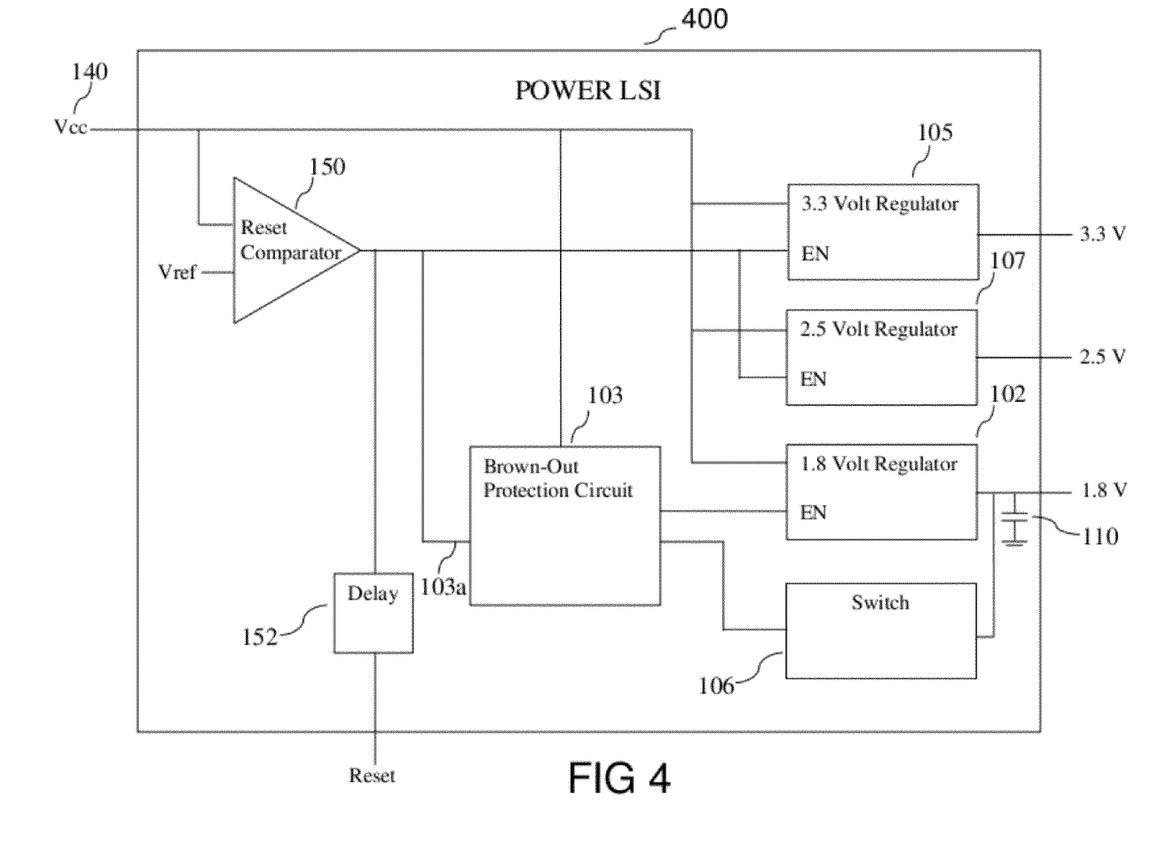
FIG. 4 is a schematic diagram illustrating one embodiment of a power LSI chip incorporating a brown-out protection circuit.

Referring to FIG. 4, a Power LSI chip 400 is shown according to an embodiment of the present invention. The power LSI chip 400 comprises a plurality of voltage regulators (comprising 1.8 volt, 2.5 volt, and 3.3 volt voltage regulators 102, 107, and 105, respectively), a reset comparator 150, the brown-out protection circuit 103, the switch 106, and the first capacitor 110. The plurality of voltage regulators 102, 105, 107, the reset comparator 150, and the brown-out protection circuit 103 are coupled to a voltage reference source Vcc 140. The voltage reference source Vcc 140 may be approximately 5.0 volts according to an embodiment of the invention. However, any suitable voltage level may be used based on the device requirements. Alternative embodiments may include additional or fewer voltage regulators.

The reset comparator 150 has a first input coupled to the voltage reference source Vcc 140 and a second input coupled to a reset reference voltage Vref. The reset reference voltage Vref may be approximately 4.2 volts according to an embodiment of the invention. However, any voltage level may be used to create an appropriate voltage threshold based on the device requirements. An output of the reset comparator 150 is coupled to an enable input of the voltage regulators 105, 107, the brown-out protection circuit 103, and a delay circuit 152. The delay circuit 152 provides a global reset signal to an external pin.

The output of the reset comparator 150 provides a first undervoltage detection signal to the brown-out protection circuit 103 according to an embodiment of the invention. The output of the brown-out protection circuit 103 is coupled to the switch 106. The output of the brown-out protection circuit 103 is coupled to the enable input of the voltage regulator 102 in this embodiment, however, the output of reset comparator 150 may be coupled directly to the enable input in other embodiments. The switch 106 is coupled to the first capacitor 110 at an output node.

Operation of the brown-out protection circuit 103 in the power LSI chip 400 will now be described. The reset comparator 150 senses the occurrence of an undervoltage condition on the voltage reference source Vcc 140, causing the reset comparator output level to transition low. This first undervoltage detection signal is coupled to a first undervoltage detection input 103a of the brown-out protection circuit 103. The brown-out protection circuit 103 detects that an undervoltage condition has occurred and provides a switch output signal that causes the switch 106 to close, which in turn discharges the regulated output voltage Vo across the first capacitor 110 below a predetermined voltage level. The same low level first undervoltage detection signal may also disable the voltage regulator 102.

After the brown-out condition passes, the Vcc voltage 140 rises above the reset reference voltage Vref, causing the reset comparator 150 output to transition to a high level. The brown-out protection circuit 103 then detects that the undervoltage condition has passed and provides a switch output signal that causes the switch 106 to open, which prevents further discharge of the first capacitor 110. The high first undervoltage detection signal may also enable the voltage regulator 102. The enabled voltage regulator 102 then provides the regulated output voltage Vo to the first capacitor 110 at the output node. The regulated output voltage Vo increases from a first output voltage level to a second output voltage level.

Figure 5:
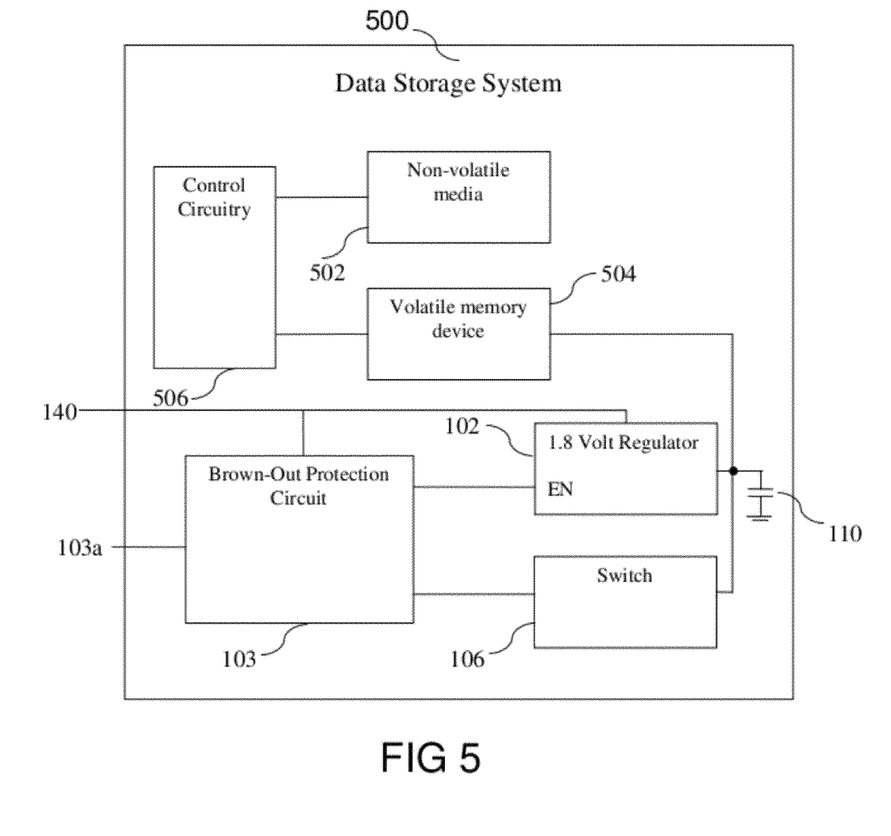
FIG. 5 is a schematic diagram illustrating an embodiment of a data storage system incorporating a brown-out protection circuit.

FIG. 5 is a schematic diagram illustrating an embodiment of a data storage system 500 incorporating the brown-out protection circuit 103. The data storage system 500 comprises non-volatile media 502, volatile memory device 504, control circuitry 506, the brown-out protection circuit 103, the switch 106, the first capacitor 110, and the voltage regulator 102. An output of the voltage regulator 102 is coupled to the volatile memory device 504 to provide a regulated output voltage Vo to the volatile memory device 504.

The brown-out protection circuit 103 responds to a first undervoltage detection signal provided to the first undervoltage detection input 103a. The brown-out protection circuit 103 in the data storage system 500 then operates in a similar fashion as described previously to discharge the capacitor 100 to a predetermined voltage level.

The control circuitry 506 is coupled to the non-volatile media 502 and the volatile memory device 504 for controlling access to the non-volatile media 502 and the volatile memory device 504. The non-volatile media 502 may comprise any type of non-volatile media, such as magnetic disks, optical disks, solid state media, and non-volatile semiconductor memory. Further, the volatile memory device 504 may comprise any type of volatile memory, such as Dynamic Random Access Memory (DRAM) and Double Data Rate Dynamic Random Access Memory (DDR DRAM).

Figure 6:
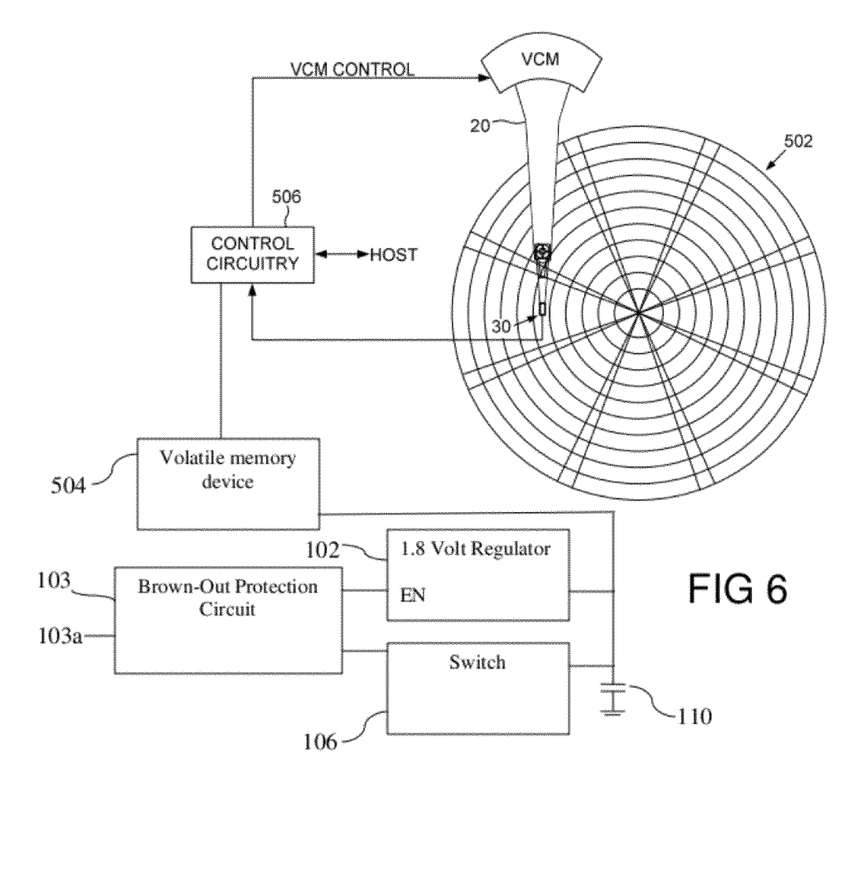
FIG. 6 is a schematic diagram illustrating an embodiment of a data storage system comprising a head, a non-volatile disk, an actuator, and control circuitry.

FIG. 6 is a schematic diagram illustrating one embodiment of the data storage system 500 comprising a head 30, a non-volatile disk 502, an actuator 20, and the control circuitry 506. The head 30 reads data from the non-volatile disk 502 and the actuator 20 positions the head 30 relative to the non-volatile disk 502. The control circuitry 506 is coupled to the actuator 20 for controlling the positioning of the head 30 relative to the disk 502. This embodiment further comprises a brown-out protection circuit 103 coupled to a volatile memory device 504 for providing a regulated voltage Vo to the volatile memory device 504 as described previously.

Figure 7:
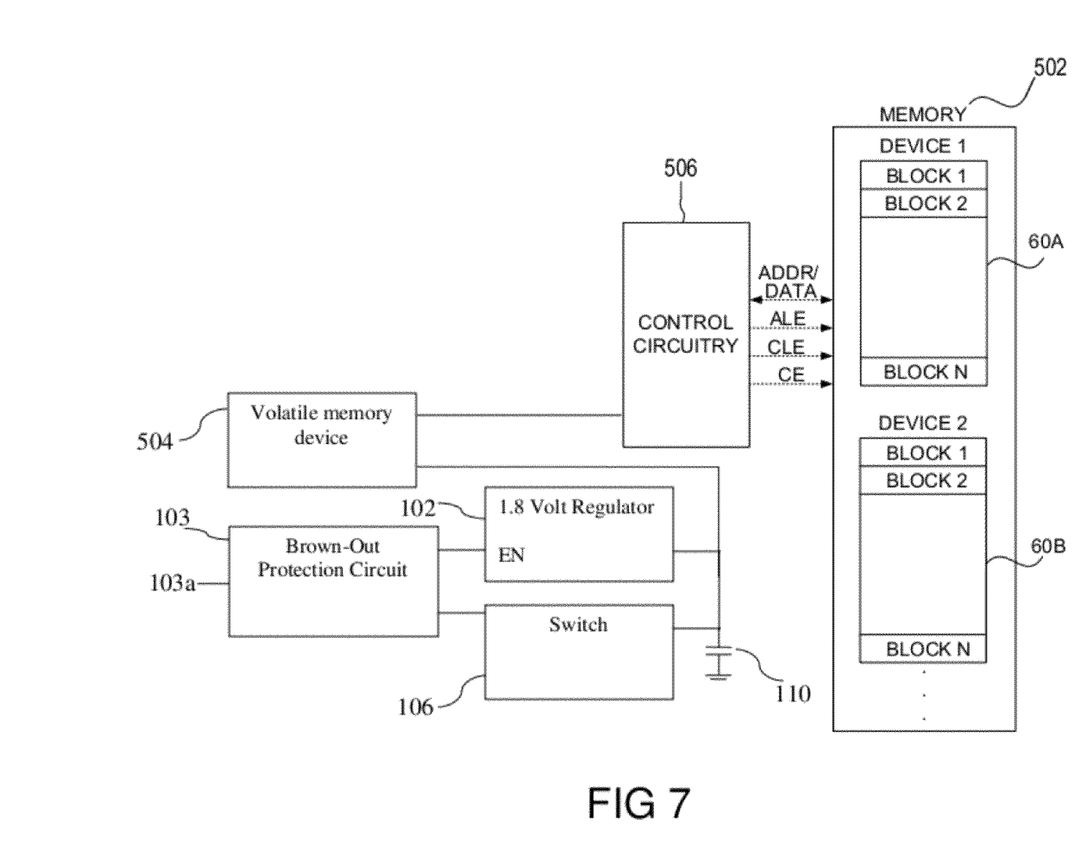
FIG. 7 is a schematic diagram illustrating an embodiment of a data storage system comprising control circuitry coupled to a volatile memory device or a non-volatile media.

FIG. 7 is a schematic diagram illustrating an embodiment of the data storage system 500 comprising control circuitry 506 coupled to the non-volatile media 502 and the volatile memory device 504. This embodiment also comprises a brown-out protection circuit 103 coupled to the volatile memory device 504 for providing a regulated voltage Vo to the volatile memory device 504 as described previously.

Figure 8:
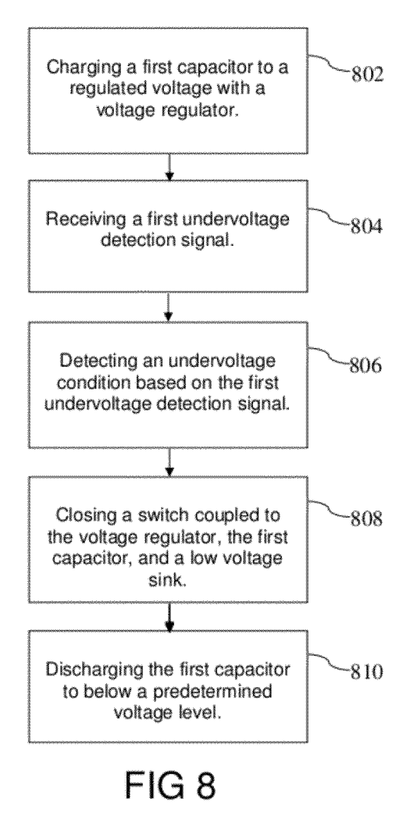
FIG. 8 is a block diagram illustrating a method for protecting against a brown-out condition in accordance with an embodiment of the invention.

FIG. 8 is a block diagram illustrating a method for protecting against a brown-out condition in accordance with an embodiment of the invention. The method comprises charging a first capacitor to a regulated voltage with a voltage regulator (act 802), wherein the voltage regulator is coupled to a voltage reference source Vcc, receiving a first undervoltage detection signal (act 804), detecting an undervoltage condition based on the first undervoltage detection signal (act 806), closing a switch coupled to the voltage regulator, the first capacitor, and a low voltage sink (act 808), and discharging the first capacitor to below a predetermined voltage level (act 810).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. An apparatus for regulating an output voltage, comprising:
 a voltage reference source Vcc;
 a first capacitor;
 a voltage regulator coupled to the voltage reference source Vcc and the first capacitor to charge the first capacitor to a regulated output voltage ($V_O$);
 a switch operably coupled to the voltage regulator, the first capacitor, and to a low voltage sink; and
 a brown-out protection circuit coupled to the switch, the brown-out protection circuit comprising a first undervoltage detection input, wherein when the brown-out protection circuit detects an undervoltage condition based on a first undervoltage detection signal received at the first undervoltage detection input, the brown-out protection circuit closes the switch to discharge the first capacitor to below a predetermined voltage level,
 wherein the first undervoltage detection signal is generated based on the regulated output voltage (Vo).

2. The apparatus of claim 1, wherein the brown-out protection circuit comprises a first comparator coupled to the first undervoltage detection input.

3. The apparatus of claim 2, wherein the brown-out protection circuit comprises a second undervoltage detection input to receive a second undervoltage detection signal.

4. The apparatus of claim 3, wherein the brown-out protection circuit comprises a diode coupled to the second undervoltage detection input, wherein the second undervoltage detection signal is derived from the voltage reference source Vcc.

5. The apparatus of claim 4, wherein the brown-out protection circuit further comprises a second comparator coupled with the switch, the second comparator comprising a first input coupled to the diode and a second input coupled to an output of the first comparator.

6. The apparatus of claim 5, wherein the second comparator closes the switch based on the first and second undervoltage detection signals.

7. The apparatus of claim 5, wherein the first and second comparators comprise first and second differential operational amplifiers.

8. The apparatus of claim 2, wherein the voltage regulator comprises an enable input coupled to an output of the first comparator.

9. The apparatus of claim 1, wherein the switch comprises a first transistor.

10. The apparatus of claim 1, wherein the brown-out protection circuit detects that the undervoltage condition has passed and opens the switch.

11. The apparatus of claim 10, wherein the voltage regulator monotonically charges the first capacitor from the predetermined voltage level to the regulated output voltage Vo.

12. The apparatus of claim 1, wherein the brown-out protection circuit further comprises a delay circuit coupled to the first undervoltage detection input.

13. The apparatus of claim 12, wherein the delay circuit comprises a first resistor and a diode coupled in parallel with a second capacitor.

14. The apparatus of claim 13, wherein, when the first undervoltage detection signal increases, the delay circuit charges the second capacitor over a predetermined time.

15. The apparatus of claim 14, wherein the predetermined time is at least equal to the time for the first capacitor to discharge below the predetermined voltage level.

16. The apparatus of claim 1, wherein the first capacitor is operably coupled to a Dynamic Random Access Memory (DRAM).

17. The apparatus of claim 16, wherein the DRAM is a Double Data Rate Dynamic Random Access Memory (DDR DRAM).

18. The apparatus of claim 1, further comprising a second resistor coupled between the first capacitor and the switch.

19. The apparatus of claim 1, wherein the predetermined voltage level is approximately 300 mV and the regulated output voltage level Vo is approximately 1.8 V.

20. The apparatus of claim 1, wherein the voltage regulator comprises a voltage regulator output node ($V_{FB}$) and the regulated output voltage ($V_O$) across the first capacitor is determined by a resistor divider coupled between the voltage regulator output node ($V_{FB}$).

21. The apparatus of claim 20, wherein the resistor divider comprises a first resistor being coupled between $V_{FB}$ and the first capacitor and a second resistor being coupled between $V_{FB}$ and a low supply voltage such that $V_O = V_{FB}(1+R_1/R_2)$.

22. The apparatus of claim 1, wherein the first undervoltage detection signal comprises a regulated voltage derived from the voltage reference source Vcc, wherein the regulated voltage level is lower than Vcc.

23. The apparatus of claim 1, wherein the first undervoltage detection signal is a reset signal indicating that the voltage regulator should be reset.

24. The apparatus of claim 1, further comprising a second voltage regulator to provide the first undervoltage detection signal.

25. The apparatus of claim 1, further comprising a reset comparator having a first input coupled to the voltage reference source Vcc, a second input coupled to a reset reference voltage, and an output coupled to the brown-out protection circuit.

26. A data storage system comprising:
a non-volatile media;
a volatile memory device;
a voltage reference source Vcc;
a first capacitor coupled to the volatile memory device;
a voltage regulator coupled to the voltage reference source Vcc and the first capacitor to charge the first capacitor to a regulated output voltage ($V_O$);
a switch operably coupled to the voltage regulator, the first capacitor, and to a low voltage sink; and
a brown-out protection circuit coupled to the switch, the brown-out protection circuit comprising a first undervoltage detection input, wherein when the brown-out protection circuit detects an undervoltage condition based on a first undervoltage detection signal received at the undervoltage detection input, the brown-out protection circuit closes the switch to discharge the first capacitor to below a predetermined voltage level,
wherein the first undervoltage detection signal is generated based on the regulated output voltage (Vo).

27. The storage system of claim 26, further comprising control circuitry coupled to the non-volatile media and the volatile memory device for controlling access to the non-volatile media and the volatile memory device.

28. The storage system of claim 26, wherein the non-volatile media comprises a disk and the storage system further comprises a head for reading data from the disk.

29. The storage system of claim 28, further comprising an actuator for positioning the head relative to the disk.

30. The storage system of claim 29, further comprising control circuitry coupled to the actuator for controlling the positioning of the head relative to the disk.

31. The storage system of claim 26, wherein the non-volatile media comprises at least one media selected from the group consisting of a magnetic disk, an optical disk, a solid state media, and a non-volatile semiconductor memory.

32. The storage system of claim 26, wherein the volatile memory device comprises a Dynamic Random Access Memory (DRAM).

33. The storage system of claim 26, wherein the volatile memory device comprises a Double Data Rate Dynamic Random Access Memory (DDR DRAM).

34. A method for protecting against a brown-out condition, comprising:
charging a first capacitor to a regulated voltage with a voltage regulator, wherein the voltage regulator is coupled to a voltage reference source Vcc;
receiving a first undervoltage detection signal;
detecting an undervoltage condition based on the first undervoltage detection signal;
closing a switch coupled to the voltage regulator, the first capacitor, and a low voltage sink;
discharging the first capacitor to below a predetermined voltage level; and
delaying the first undervoltage detection signal for a predetermined time, wherein the predetermined time is at least equal to the time for the first capacitor to discharge to the predetermined voltage level.

35. The method of claim 34, further comprising comparing the first undervoltage detection signal to a second undervoltage detection signal.

36. The method of claim 35, wherein the second undervoltage detection signal is derived from the voltage reference source Vcc.

37. The method of claim 36, further comprising generating the second undervoltage detection signal based on the voltage reference source Vcc and a diode.

38. The method of claim 35, wherein the first undervoltage detection signal comprises a regulated voltage derived from the voltage reference source Vcc, wherein the regulated voltage level is lower than Vcc.

39. The method of claim 34, wherein the switch comprises a first transistor.

40. The method of claim 34, further comprising disabling the voltage regulator.

41. The method of claim 34, further comprising monotonically charging the first capacitor from the predetermined voltage level to the regulated output voltage.

42. The method of claim 34, wherein the first undervoltage detection signal is a reset signal.

43. An apparatus for regulating an output voltage, comprising:
a voltage reference source Vcc;
a first capacitor;
a voltage regulator coupled to the voltage reference source Vcc and the first capacitor to charge the first capacitor to a regulated output voltage ($V_O$);
a switch operably coupled to the voltage regulator, the first capacitor, and to a low voltage sink; and
a brown-out protection circuit coupled to the switch, the brown-out protection circuit comprising:
a first undervoltage detection input to receive a first undervoltage detection signal;
second undervoltage detection input to receive a second undervoltage detection signal, wherein the second undervoltage detection signal is derived from the voltage reference source Vcc;
a diode coupled to the second undervoltage detection input;
a first comparator coupled to the first undervoltage detection input; and
a second comparator coupled with the switch, the second comparator comprising a first input coupled to the diode and a second input coupled to an output of the first comparator,
wherein when the brown-out protection circuit detects an undervoltage condition based on the first undervoltage detection signal received at the first undervoltage detection input, the brown-out protection circuit closes the switch to discharge the first capacitor to below a predetermined voltage level.

44. The apparatus of claim 43, wherein the second comparator closes the switch based on the first and second undervoltage detection signals.

45. The apparatus of claim 43, wherein the first and second comparators comprise first and second differential operational amplifiers.

46. An apparatus for regulating an output voltage, comprising:
- a voltage reference source Vcc;
- a first capacitor;
- a voltage regulator coupled to the voltage reference source Vcc and the first capacitor to charge the first capacitor to a regulated output voltage ($V_O$);
- a switch operably coupled to the voltage regulator, the first capacitor, and to a low voltage sink; and
- a brown-out protection circuit coupled to the switch, the brown-out protection circuit comprising:
  - a first undervoltage detection input; and
  - a delay circuit coupled to the first undervoltage detection input, the delay circuit comprising a first resistor and a diode coupled in parallel with a second capacitor,
- wherein when the brown-out protection circuit detects an undervoltage condition based on a first undervoltage detection signal received at the first undervoltage detection input, the brown-out protection circuit closes the switch to discharge the first capacitor to below a predetermined voltage level, and
- when the first undervoltage detection signal increases, the delay circuit charges the second capacitor over a predetermined time, wherein the predetermined time is at least equal to the time for the first capacitor to discharge below the predetermined voltage level.

* * * * *